United States Patent [19]
Chu et al.

[11] 3,886,451
[45] May 27, 1975

[54] RANDOM PHASE MODULATING TIME BASE AND METHOD TO IMPROVE MEASUREMENT AVERAGING COUNTER RESOLUTION

[75] Inventors: David C. Chu, Woodside; John H. Gliever, San Jose, both of Calif.

[73] Assignee: Hewlett-Packard Company, Palo Alto, Calif.

[22] Filed: Jan. 28, 1974

[21] Appl. No.: 437,460

[52] U.S. Cl. ......... 324/186; 235/92 TF; 236/92 PS; 235/151.3; 324/780; 324/830
[51] Int. Cl. ............................................. G04f 11/06
[58] Field of Search ....... 324/186, 187, 78 D, 79 D, 324/83 D, 99 D; 235/92 T, 92 TF, 92 FQ, 92 PS, 151.3, 151.32

[56] References Cited
UNITED STATES PATENTS 2,749,514   6/1956   Zaffarano ........................ 324/186
2,831,162   4/1958   Gross ............................. 324/186

*Primary Examiner*—Stanley T. Krawczewicz
*Attorney, Agent, or Firm*—Theodore Scott Park

[57] ABSTRACT

A time base and method to provide resolution improvement for measurement averaging counters when measuring an applied signal comprising time intervals or pulsed frequencies repetitively occurring at rates synchronous to a counter's clock frequency.

The phase of a reference frequency is varied in response to a random signal. The phase modulated reference frequency is applied to a frequency multiplier chain which multiplies both the frequency and the effective amount of phase modulation. The randomly phase shifting output of the frequency multiplier chain is applied as a clock signal to a measurement averaging counter thereby destroying coherence between the clock signal and the applied signal and allowing statistical averaging to take place.

16 Claims, 5 Drawing Figures

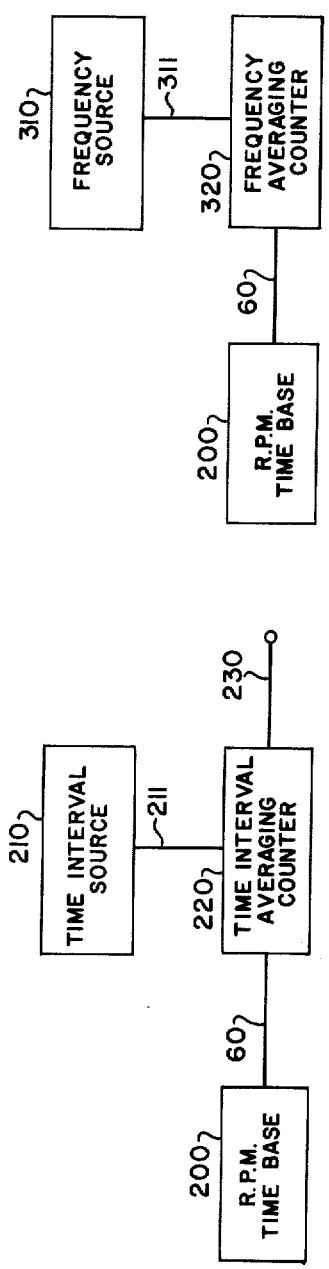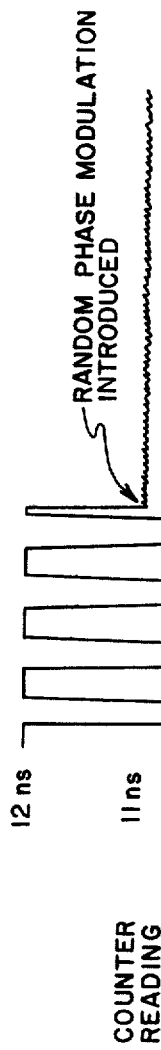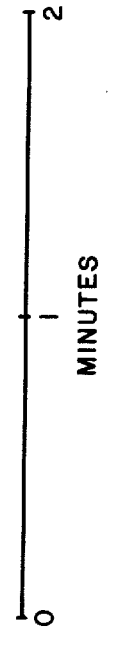

RANDOM PHASE MODULATING TIME BASE AND METHOD TO IMPROVE MEASUREMENT AVERAGING COUNTER RESOLUTION

BACKGROUND OF THE INVENTION

Typical devices and methods for measuring the time interval between two signals include connecting a source of periodic clock pulses to a clock gate. A first signal is used to enable the clock gate and thereby pass clock pulses of known period through the gate. A second signal is used to disable the clock gate and thereby inhibit the passage of clock pulses through the gate. The output is counted and the time interval is proportional to the number of pulses counted.

Disadvantages with this technique are that the shortest time interval which can be resolved is determined by the period of the clock pulses and the reading obtained may have an error corresponding to ±1 pulse count.

Additional error is introduced by using traditional direct control gating methods. When the gate opens it may truncate some fraction of a clock pulse. When closing, the gate may again truncate a clock pulse. The response of the counter circuitry to a fraction of a clock pulse cannot be reliably determined. Depending on the time relative to the clock period when the time interval occurs, these fractions of clock pulses may be counted as zero, one or two clock pulses. If a number of time intervals are averaged, the average reading is a function of the response of the counter circuitry to fractional pulses which is difficult to control and a potential source of significant error.

This error can be greatly reduced and resolution improved by synchronizing the opening and closing of the clock gate with the periodic clock pulses and taking the average of a number of time interval measurements as disclosed, for example, in U.S. Pat. No. 3,631,343.

Such time interval averaging counters employing a synchronized clock gate produce valid and useful results for a majority of measurements possible. However, if a repetition rate of time intervals to be averaged is synchronous with the clock rate of periodic pulses from the counter's timebase, then typical averaging methods will not improve resolution beyond a ±1 pulse count error.

These synchronous rates are given by $fo/(Q+(L/M))$ where fo is the time base clock frequency; $Q$, $L$, and $M$ are positive integers and L, M are co-prime. The worst case occurs when $M=L=1$ at which time no averaging at all takes place. For other values of $M$, partial averaging takes place with ever-increasing effectiveness as $M$ increases. These frequencies, together with a small band of frequencies around each of them, are very numerous, often encountered and somewhat cumbersome to detect. A counter in a synchronous condition typically appears to hang up on some value which may be, but is not limited to, a reading that is an integral multiple of the clock period and averaging intervals will not increase the resolution of the measurement.

Similar limitations in resolution are observed in counters which pass a signal to be measured through a clock gate whose time window is determined by a fixed number of pulses produced at the clock rate by the counter's timebase. The gated signal may be, for example, a pulsed radio frequency signal whose frequency is to be determined. By counting the number of periods of the signal gated and dividing this number by the known time interval of the time window, frequency can be obtained within ±1 count. In averaging, a number of these known time intervals or time windows are generated and the gated periods are totalized. The average frequency is then the totalized periods gated divided by the sum of all the time intervals generated. If the unknown frequency and the intervals generated by the timebase exhibit a synchronous relationship, the same problem arises as in the time interval averaging case and statistical averaging does not take place. The fundamental problem is the relative coherence between the gating and the gated signal.

DESCRIPTION OF THE DRAWINGS

FIG. 3 is a drawing of an embodiment of the invention wherein the apparatus of FIG. 1 is employed as a timebase for a typical time interval averaging counter.

FIG. 4 is a graph showing counter readings produced by the apparatus of FIG. 3 when measuring time intergals repetitively occurring at a rate synchronous to the counter's clock frequency.

FIG. 5 is a drawing of an embodiment of the invention wherein the apparatus of FIG. 1 is employed as a timebase for a frequency averaging counter.

SUMMARY OF THE INVENTION

The present invention provides a timebase and method which will consistently provide the resolution improvement predicted by statistics for time interval and frequency measurement averaging counters without regard to whether the repetition rate of the time intervals to be measured is synchronous with the counter's clock frequency. The phase relationship of a clock signal with respect to an applied signal is intentionally varied. The phase variation destroys coherence between the clock signal and an unknown signal thereby allowing statistical averaging to take place.

DESCRIPTION OF THE PREFERRED EMBODIMENT

Figure 1:
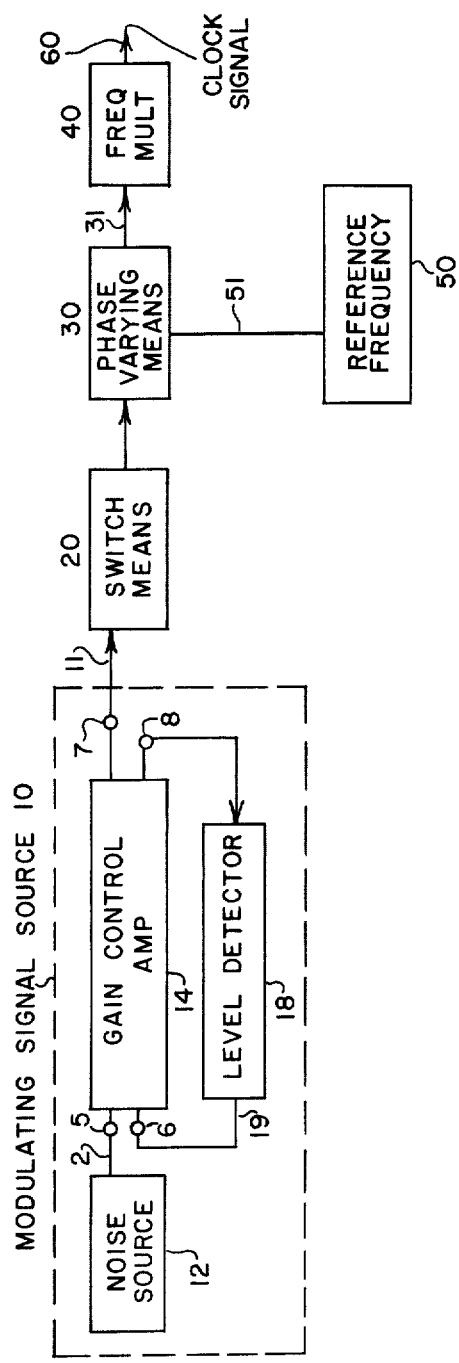
FIG. 1 is a drawing of a preferred embodiment of the invention.

Referring to FIG. 1 there is shown a random phase modulated timebase. Noise source 12 produces a random or pseudo random signal 2 and is connected to a first input 5 of gain control amplifier 14. Gain control amplifier 14 amplifies the amplitude and band limits the frequency of the random signal 2 from noise source 12. A first output 8 of gain conrol amplifier 14 is connected to level detector 18 which detects the amplified noise level amplitude of output gain control amplifier 14 and produces a level control signal 19 corresponding to an average of amplified noise level amplitude output peaks which are above a predetermined level. The level signal 19 is fed back to a second input 6 of gain control amplifier 14 to provide automatic gain control of the amplification and thereby provide a leveled and amplified modulating signal 11 at a second output 7 of gain control amplifier 14. The second output 7 is connected by switch means 20 to phase varying means 30. Switch means 20 provides a capability of disconnecting the modulating signal 11 from phase varying means 30. Phase carying means 30 varies the phase of a reference frequency 51 produced by reference frequency source 50 in response to the modulating signal 11 and produces as an output a random phase shifted reference frequency signal 31. The random phase shifted reference frequency signal 31 is applied to a frequency multiplier chain 40 which multiplies the frequency and amount of phase shift and produces as an output a clock signal 60.

Figure 2:
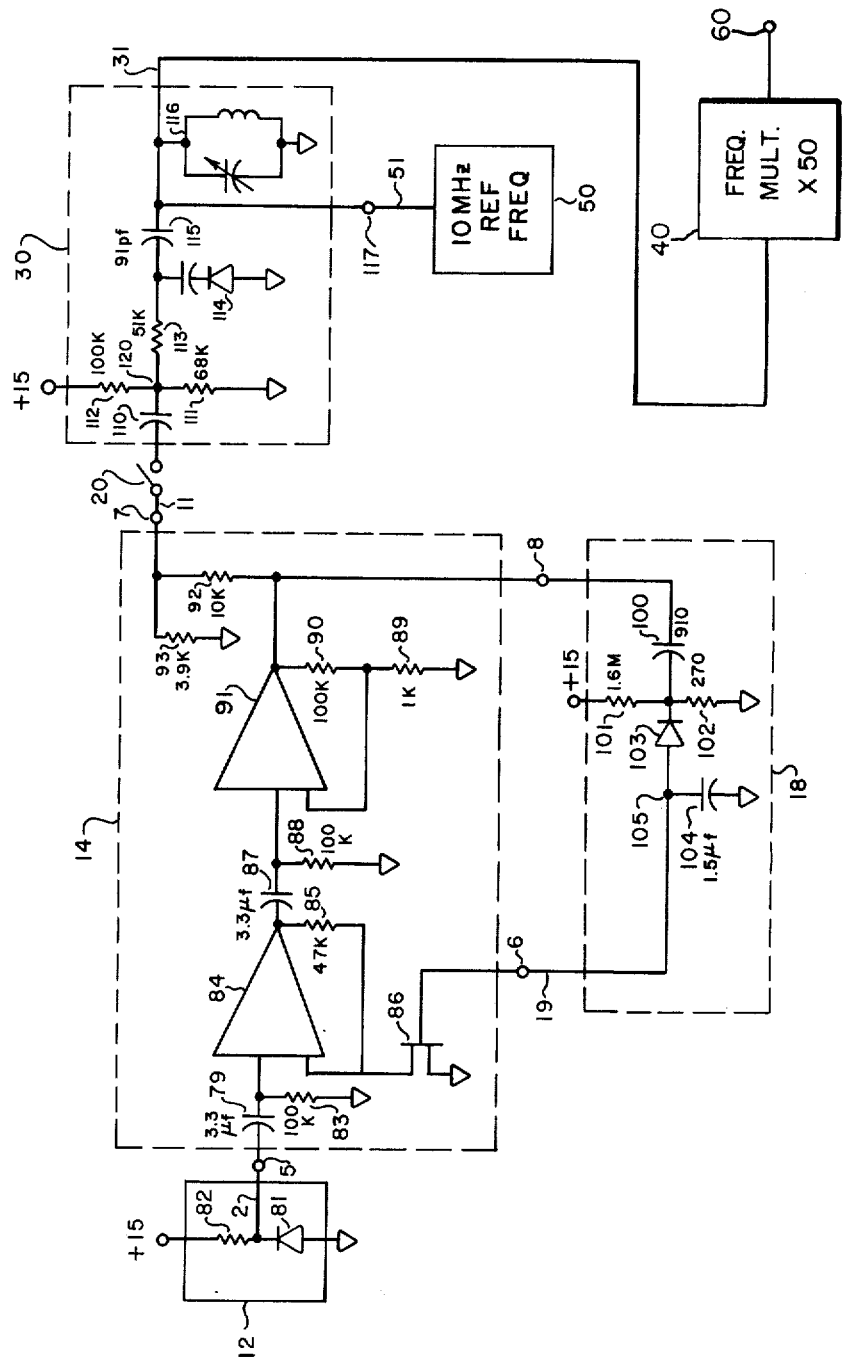
FIG. 2 is a detailed schematic of the apparatus in FIG. 1.

Referring now to FIG. 2 there is shown a detailed preferred embodiment of a random phase modulated timebase. In this embodiment noise source 12 produces random white gaussian noise which is generated by a reverse biased zener diode 81. Zener diode 81 is connected serially with a biasing resistor 82 between a 15 volt power source and ground potential. The random signal 2 is obtained from the cathode of zener diode 81 and applied to the first input 5 of gain control amplifier 14.

Gain control amplifier 14 utilizes integrated circuit operational amplifiers, for example National Semiconductor LM 301A, or the like. The random signal 2 is coupled by capacitor 79 to the input of first operational amplifier 84. The gain of the first operational amplifier is determined by the ratio $R_{85} + R_{86}/R_{86}$ where $R_{85}$ is the resistance of resistor 85, and $R_{86}$ is is the resistance provided by field effect transistor 86. The output of operational amplifier 84 is coupled by capacitor 87 to a second operational amplifier 91. The gain of second operational amplifier 91 is determined by the ratio $R_{89} + R_{90}R_{89}$ where $R_{89}$ is the resistance of resistor 89, and $R_{90}$ is the resistance of resistor 90. The output of the second operational amplifier 91 is connected to first output 8 and by means of isolation resistor 92 to secoond output 7. A resistor 93 is connected between output 7 and ground to reduce the output level of modulating signal 11.

Level detector 18 is connected to gain control amplifier 14 at first output 8. The output of second operational amplifier 91 which appears at output 8 is coupled by capacitor 100 to the cathode of a silicon diode 103. The cathhode of diode 103 is maintained at a threshold voltage level by means of a voltage dividing network consisting of resistor 101 and resistor 102 connected serially between a 15 volt source and ground and at their junction to the cathode of diode 103. Amplifier noise voltage peaks from the output of second operational amplifier 91 which are greater in negative amplitude than the sum of the threshold voltage level established at the cathode of diode 103 and a 0.7 volt forward bias potential for the silicon diode are applied to capacitor 104. Voltage changes which develop across capacitor 104 change the voltage potential at point 105 and create level signal 19. Level signal 19 is applied to field effect transistor 86 within gain control amplifier 14 thereby changing resistance $R_{86}$ and the gain of gain control amplifier 14.

The observed frequency band limiting of the leveled and amplified modulating signal 11 at the second output 7 is approximately 3 KHz, and is primarily due to the operating characteristics of the operational amplifiers 84 and 91. Excessive noise frequency bandwidth could be suitably limited by insertion of a filter network within gain control amplifier 14, or serially before first input 5, or after second output 7.

Modulating signal 11 is connected by a switch 20 to capacitor 110 within phase varying means 30. Capacitor 110 couples modulating signal 11 to point 120. Resistors 111 and 112 are connected in series and between a 15 volt source and ground thereby establishing a bias potential at point 120. The potential at point 120 is varied about the bias potential by the modulating signal 11 and is coupled to the cathode of varactor 114 by resistor 113. Varactor 114 changes its capacitance in response to the voltage variations occurring at point 120. Coupling capacitor 115 couples the capacitance variations of varactor 114 to parallel tuned tank circuit 116. The tank circuit 116, capacitor 115, and varactor 114 are tuned to resonate the phase varying means 30 to the reference frequency 51. The modulating signal 11 varies the capacitance of varactor 114 in such a way that the phase varying means 30 is detuned slightly to both sides of resonance. Detuning phase varying means 30 to the low frequency side of resonance causes a phase shift of signal 31 and detuning to the high frequency side causes an opposite phase shift. For a reference frequency 51 of 10 MHz the RMS phase shift is approximately 7 degrees.

The random phase shifted signal 31 is applied to a typical frequency multiplier chain 40 which multiplies the frequency of signal 31 by 50 from 10 MHz to 500 MHz and produces clock signal 60. The time shift resulting from the phase shift due to modulating signal 11 at 10 MHz results in an effective phase shift of clock signal 60 at 500 MHz which is also multiplied by 50 since the effective phase shift is the frequency divided by the time shift. The standard deviation of the phase modulation at 500 MHz should be at least approximately a full period phase shift of clock signal 60 in order to insure statistical averaging under synchronous rates.

Referring to FIG. 3 there is shown another embodiment of the invention which utilizes the random phase modulated timebase of FIG. 2 at the timebase for a typical measurement averaging counter 220 set to a time interval averaging mode, for example, a Hewlett-Packard Model 5345A, a counter of the type disclosed in U.S. Pat. 3,631,343, or the like. Assume that a time interval source 210 whose output is to be measured produces time intervals 211 of 11 ns at a repetition rate of exactly 50 MHz which is an exact subharmonic of the 500 MHz clock rate produced by the random phase modulated timebase 200. If switch means 20 within timebase 200 is adjusted in an off position so that there is no modulating signal 11 applied to phase varying means 30 there will be no random phase shifting of the clock signal 60. Since this is a synchronous condition no statistical averaging takes place and the counter reads either 10 ns of 12 ns dependent upon the initial phase relationship. If switch means 20 is adjusted to an on position so that the clock signal 60 is randomly phase shifted, the coherence is destroyed enabling the statistical averaging mechanism to take place and the counter reading approaches 11 ns. FIG. 4 is a graph of the counter output reading 230 for the embodiment shown in FIG. 3 and time intervals 211 of 11 ns duration applied at a repetition rate of 50 MHz plus approximately 0.1 Hz. The 0.1 Hz frequency off-set allows the counter reading to traverse from one reading to the other several times during the measurement duration. When the random phase modulation is introduced as shown in FIG. 4, the coherence is destroyed, the statical averaging mechanism takes place, and resolution is improved.

The penalty for phase modulating the time base is not severe. For a modulating signal 11 which has a modulation standard deviation of 360° and is band limited to 3 KHz, error is completely dominated by normal ±1 count quantization error when measuring time intervals less than 7 μsec and no degradation in accuracy due to the random phase modulation can be observed. For time intervals much greater than 7 μsec, phase modulating the timebase increases the standard deviation of measurements by a factor of 2.75 above that due to the ±1 count quantization error which is the minimal error possible at non-synchronous rates. This increase in standard deviation is reduced by averaging a greater number of intervals.

Referring to FIG. 5 there is shown another preferred embodiment of the invention wherein the timebase of FIG. 2 is used as the timebase 200 for a frequency averaging counter 320 when measuring an applied signal 311 comprising a pulsed frequency repetitively occurring at a rate synchronous to the frequency of the clock signal 60. Another preferred embodiment of the invention includes using a pseudo random signal source as the modulating signal source 10. Typical pseudo random signal sources, such as a Hewlett-Packard Model 3722A, or the like, may be utilized.

Another preferred embodiment of the invention includes using a modulating signal source 10 which will produce deterministic waveforms such as those produced by typical oscillators, function generators, or the like.

We claim:

1. A method for improving resolution of a time interval measuring device wherein reference pulses at a constant frequency are counted comprising the steps of:
   time varying during a measurement period the phase relationship between an applied signal having a plurality of repetitive intervals to be measured and the reference pulses;
   applying the reference pulses to a gate synchronized with the reference pulses;
   passing the reference pulses through the gate a plurality of times in response to the applied signal;
   counting the number of pulses passed;
   averaging the count obtained; and
   multiplying the average by a reference pulse period to obtain a time interval measurement.

2. A method as in claim 1 wherein the step of time varying the phase relationship comprises the steps of:
   generating a reference signal of known frequency;
   generating a time varying signal;
   phase varying the reference signal in response to the time varying signal; and
   producing reference pulses in response to the phase varying reference signal.

3. A method as in claim 1 wherein the step of varying the phase relationshsip comprises the steps of:
   generating a reference signal of known frequency;
   generating a time varying signal;
   phase varying the reference signal in response to the time varying signal;
   frequency multiplying the phase varying reference signal; and
   producing phase varying reference pulses in response to the frequency multiplied phase reference signal.

4. A method as in claim 1 wherein the step of time varying during a measurement period the phase relationship between an applied signal and the reference pulses comprises the steps of:
   generating a time varying signal; and
   phase varying the applied signal in response to the time varying signal.

5. A method for improving resolution of a frequency measuring device wherein an applied signal to be measured is passed a plurality of times through a synchronized clock gate whose time window is determined by a fixed number of pulses produced at a clock rate by the counter's time base comprising the steps of:
   time varying during a measurement period the phase relationship between the applied signal and the clock rate;
   totalizing the number of periods of the applied signal passed through the synchronized clock gate;
   summing the number of time windows; and
   dividing the totalized periods gated by the product of the sum of all the time windows generated and the time interval of a time window.

6. A method as in claim 5 wherein the step of time varying the phase relationship comprises the steps of:
   generating a reference signal of known frequency;
   generating a time varying signal;
   phase varying the reference signal in response to the time varying signal; and
   producing the fixed number of pulses in response to the phase varying reference signal.

7. A method as in claim 5 wherein the step of time varying the phase relationship comprises the steps of:
   generating a reference signal of known frequency;
   generating a time varying signal;
   phase varying the reference signal in response to the time varying signal;
   frequency multiplying the phase varying reference signal; and
   producing the fixed number of pulses in response to the frequency multiplied phase varying reference signal.

8. A method as in claim 5 wherein the step of time varying the phase relationship comprises the steps of:
   generating time varying signal; and
   phase varying the applied signal in response to the time varying signal.

9. A method for improving resolution of a time interval measuring device wherein reference pulses at a constant frequency are counted comprising the steps of:
   randomly varying during a measurment period the phase relationship between an applied signal having a plurality of repetitive intervals to be measured and the reference pulses;
   applying the reference pulses to a gate synchronized with the reference pulses;
   passing the reference pulses through the gate a plurality of times in response to the applied signal;
   counting the number of pulses passed;
   averaging the count obtained; and
   multiplying the average by the reference pulse period to obtain a time interval measurment.

10. A method as in claim 9 wherein the step of randomly varying the phase relationship comprises the steps of:
    generating a reference signal of known frequency;
    generating a randomly varying signal;
    phase varying the reference signal in response to the randomly varying signal; and
    producing reference pulses in response to the phase varying reference signal.

11. A method as in claim 9 wherein the step of varying the phase relationship comprises the steps of:

generating a reference signal of known frequency;
generating a randomly varying signal;
phase varying the reference signal in response to the randomly varying signal;
frequency multiplying the phase varying reference signal; and
producing phase varying reference pulses in response to the frequency multiplied phase varying reference signal.

12. A method as in claim 9 wherein the step of randomly varying during a measurement period the phase relationship between an applied signal and the reference pulses comprises the steps of:
generating a randomly varying signal; and
phase varying the applied signal in response to the randomly varying signal.

13. A method for improving resolution of a frequency measuring device wherein an applied signal to be measured is passed a plurality of times through a synchronized clock gate whose time window is determined by a fixed number of pulses produced at a clock rate by the counter's time base comprising the steps of:
randomly varying during a measurement period the phase relationship between the applied signal and the clock rate;
totalizing the number of periods of the applied signal passed through the synchronized clock gate;
summing the number of time windows; and
dividing the totalized periods gated by the product of the sum of all the time windows generated and the time interval of a time window.

14. A method as in claim 13 wherein the step of randomly varying the phase relationship comprises the steps of:
generating a reference signal of known frequency;
generating a randomly varying signal;
phase varying the reference signal in response to the randomly varying signal; and
producing the fixed number of pulses in response to the phase varying reference signal.

15. A method as in claim 13 wherein the step of randomly varying the phase relationship comprises the steps of;
generating a reference signal of known frequency;
genearating a randomly varying signal;
phase varying the reference signal in response to the randomly varying signal;
frequency multiplying the phase varying reference signal; and
producing the fixed number of pulses in response to the frequency multiplied phase varying reference signal.

16. A method as in claim 13 wherein the step of randomly varying the phase relationship comprises the steps of;
generating a randomly varying signal; and
phase varying the applied signal in response to the randomly varying signal.

* * * * *